Figure 1:
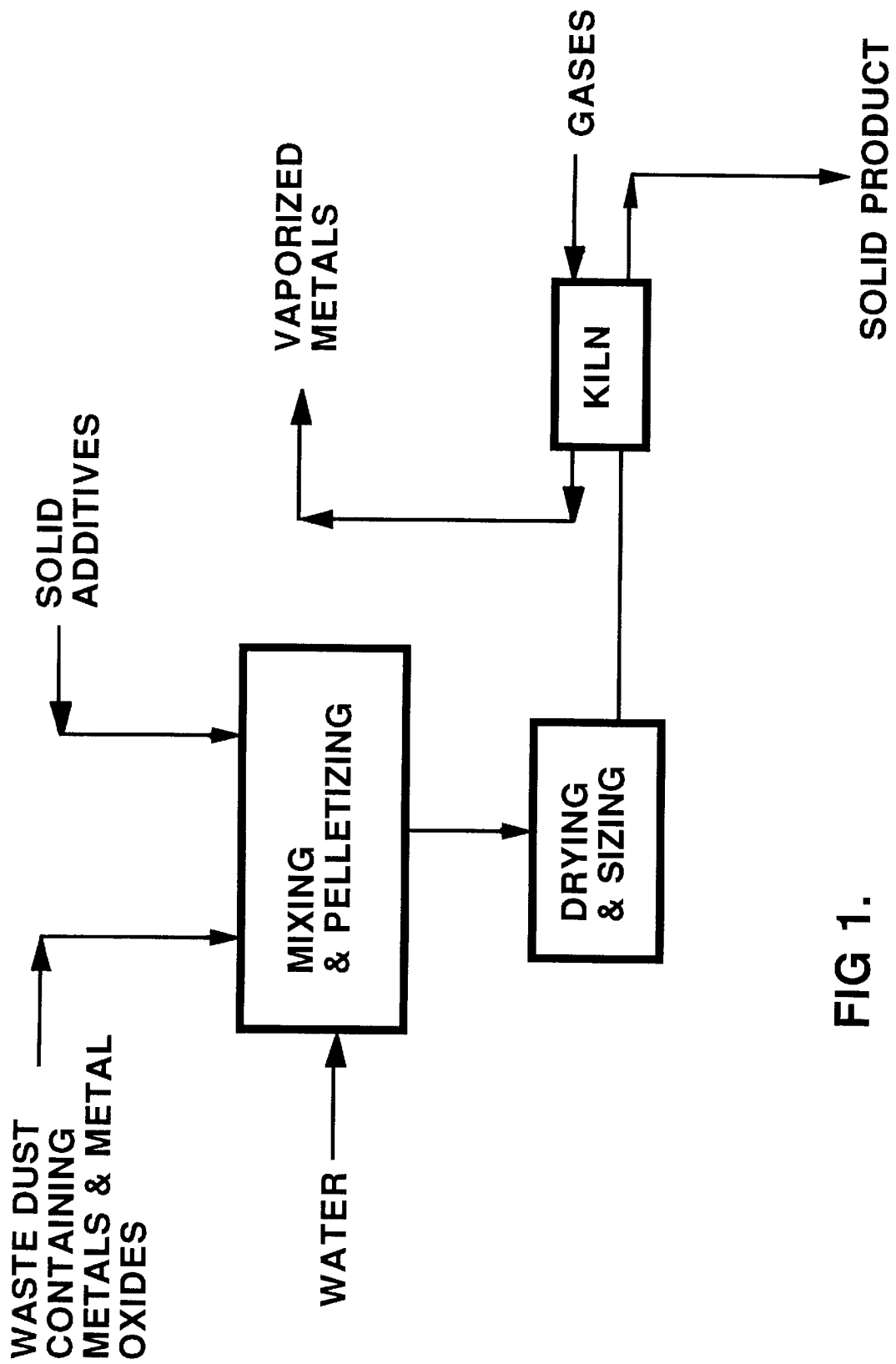

United States Patent

Weinwurm et al.

[19]

[11] Patent Number: 5,906,671
[45] Date of Patent: May 25, 1999

[54] METHOD FOR EXTRACTION OF METALS AND NON-METALS FROM MINERALS, INDUSTRIAL BY-PRODUCTS AND WASTE MATERIALS

[75] Inventors: Paul S. Weinwurm, Brampton; Lou Bodnar, Toronto; Peter L. Weinwurm, Bramalea, all of Canada

[73] Assignee: Agglo Inc., Toronto, Canada

[21] Appl. No.: 08/738,133

[22] Filed: Oct. 25, 1996

[51] Int. Cl.⁶ .................................................. C21B 13/08
[52] U.S. Cl. ................... 75/479; 75/658; 75/669; 75/694; 75/961; 423/108
[58] Field of Search ............... 423/108; 75/414, 75/479, 658, 669, 694, 961

[56] References Cited

U.S. PATENT DOCUMENTS 5,496,392  3/1996  Sims et al. ................................. 75/586

*Primary Examiner*—Melvyn Andrews
*Attorney, Agent, or Firm*—Arne I. Fors

[57] ABSTRACT

A method for separation and recovery of metals and metal oxides from industrial minerals and waste materials containing zinc, lead, cadmium, arsenic, iron, mercury and selenium. The metals and metal oxides in dust form are mixed with a reducing agent and additives, agglomerated, heated above 800° C., and contacted with a flow of inert, reducing or slightly oxidizing gases to volatilize the metals and metal oxides for recovering separate from solid residual product.

19 Claims, 1 Drawing Sheet

METHOD FOR EXTRACTION OF METALS AND NON-METALS FROM MINERALS, INDUSTRIAL BY-PRODUCTS AND WASTE MATERIALS

FIELD OF INVENTION

The present invention relates to a method for separation and recovery of metals and metal oxides from industrial minerals, by-products and waste materials containing zinc, lead, cadmium, arsenic, iron, mercury and selenium.

BACKGROUND OF INVENTION

Metallurgical processes, including steel processes, result in waste by-products of iron and steel dust. There have been many attempts to recover the Zn and Pb in this dust and to obtain a by-product which can be safely recycled or which can be safely buried with minimal metal leaching problems.

The Waltz kiln has been employed to recover Zn and Pb using a reducing roasting process. The Waltz kiln which is used is a directly heated counterflow type rotary kiln. The reducing roasting process comprises directly heating and roasting the iron and steel dust in the Waltz kiln in a reducing atmosphere under suitably selected conditions of temperature and retention time, thereby separating Zn and Pb through volatilization from the dust and enabling iron to be discharged in the form of solid reduced iron aggregates. In practice, the reducing roasting process using the Waltz kiln is problematic because it is extremely difficult to maintain the operation of the rotary kiln under the appropriate conditions for a long time and a retention time of more than 1 hour is generally required. The recovery of Pb and Zn by this process is not satisfactory. Because of direct heating by combustion of reductant and high velocity gases containing uncontrollable $CO_2$ and $O_2$ contents, unwanted particles are carried over into the zinc concentrate resulting in a poor quality of zinc concentrate. For satisfactory results the zinc has to be processed in two stages.

With the reducing roasting process using the Waltz kiln there is also a fluctuation in the operating conditions due to the deposition of low melting compounds on the walls of the kiln. This consequently impedes the continued operation of the rotary kiln. As a result, efficiency of zinc recovery is low. Although, it is possible to reduce the effects of this problem be adding the flux to the feed to the rotary kiln, thereby adjusting the melting point of the feed and enabling the feed to be completely melted within the rotary kiln.

U.S. Pat. No. 4,525,208 attempts to avoid the above problems with the Waltz Kiln caused by the depositing of material on the walls of the rotary kiln by running the volatilization in two stages. In the first stage the material is heated and Zn and Pb are partially evaporated at a lower temperature in a rotary kiln. In the second stage, the solid material from the rotary kiln is continuously fed into the rotary smelting furnace where fluxes are added to the material to lower the melting point facilitating the evaporation of the metals from the molten stage.

Other improvements in recovering zinc and lead are described in U.S. Pat. No. 3,850,613 and in U.S. Pat. No. 5,013,532. In U.S. Pat. No. 3,850,613 the improvement for separating and recovering the Zn and Pb includes granulation and bricketing the dust and then volatizing the Zn and Pb by heating the briquettes. In U.S. Pat. No. 5,013,532 hydrogen is used as a reducing agent and then the stream is humidified by a stream of water vapour to oxidize the metals and to recover the hydrogen.

There are also several systems for the recovery of Zn or Pb using a molten stage, including an electric arc furnace, an electrothermic smelting furnace and a slag fuming method. In U.S. Pat. No. 3,262,771, the recovery of Zn and Pb is carried out in a molten stage by using an electric arc furnace.

In U.S. Pat. No. 5,188,658, Zn and Pb are recovered from the molten stage in an electrothermic smelting furnace. The electrothermic smelting furnace described in U.S. Pat. No. 5,188,658 requires that the furnace be kept at high temperatures in order to maintain a volume ratio between CO2 and CO in the gas atmosphere in the smelting furnaces below 0.3.

In U.S. Pat. No. 3,017,261, Zn and Pb are recovered from the molten stage with a slag fuming method using a stationary furnace where metals are volatilized by melting the iron and steel dust completely and blowing air and reducing agent such as coal or coke into the molten iron. Because of higher temperature and operating conditions this processing offers great obstacles to the furnace operation.

There have also been attempts to render such industrial waste non-hazardouswithout recovering zinc or lead. In U.S. Pat. No. 4,840,671 electric arc furnace dust, steel dust from the production of certain specialty grades of steel, is rendered less hazardous by complexing the dust in a lime kiln dust, fly ash and hydrated lime mixture and then adding an aqueous solution containing ferrous hydroxide and calcium sulfate.

SUMMARY OF INVENTION

The present invention provides a method for recovering metals and metal oxides from minerals, industrial by-products and waste materials.

In an aspect of the present invention a method is provided which is free from the disadvantages suffered by conventional methods adopted for the recovery of Zn, Pb, Cd, As, Fe, Hg and Se.

In another aspect of the present invention there is provided a process for separating and recovering metals and metal oxides from industrial waste material containing Zn, Pb, Cd, As, Fe, Hg and Se comprising the following steps:

(a) mixing and processing the industrial waste material comprising metals and metal oxides with alkali earth metals and alkali metal complexes of alumina and silica oxides, and a reducing agent to form a solid agglomerated material;

(b) heating indirectly and/or directly the solid agglomerated material to a temperature greater than about 800° C.;

(c) contacting the heated agglomerated material with a counterflow gas comprising inert and/or reducing or mildly oxidizing gas wherein the concentration of $CO_2$ is lower than about 20% by volume and the $O_2$ concentration is lower than about 10% by volume;

(d) volatilizing the metals and metal oxides; and, (e) separately recovering solid residual product.

In a further aspect of the present invention the one stage volatilization volatizes the metals and metal oxides of Zn, Pb, Cd, As, Se and Hg.

In a further aspect of the present invention the solid product can be composed of iron, calcium, aluminum, silicon or other inorganic materials suitable for further processing in steel, cement, mineral fibre and iron alloy manufacturing or fill in the construction industry.

In another aspect of the process of the present invention the $CO_2$ volume concentration at the inlet is lower than about 20% and preferably lower than about 3%.

In another aspect of the process of the present invention the $O_2$ volume is less than 10%, preferably less than about 4%.

In a further aspect of the process of the present invention the counterflow gas comprises an inert gas such as nitrogen or $CO_2$ or a reducing gas such as CO, hydrogen or methane, each gas in an amount of less than 5% by volume.

DESCRIPTION

The invention will be more readily understood with reference to the accompanying FIGURE and the detailed description below.

FIG. 1 is a flow chart of an embodiment of the process of the invention.

FIG. 1 illustrates an embodiment of the process of the invention in which, in the pretreatment step, iron or steel dust containing Zn, Cd and Pb is first mixed together with alkali earth metals, alumina or silica oxides, and reducing agents to form dried pellets.

The mixture is pelletized using conventional methods. In a preferred embodiment, a liquid such as water or waste water is added to the mixture which is extruded into pellets. The pellets are heated, evaporating the water. The dried pellets are passed through a screen separating the remaining dust particles from the dried pellets. Preferably, the screened pellets are 1.0–20 mm in diameter and 30 mm long.

The reducing agents comprise 5–25% by weight of the dried pellets, and preferably 13% by weight of the dried pellets. In particular, the reducing agents are preferably carbon or hydrocarbons, such as polymers, oil, or asphalt in the form of dust, briquette, pellet, granular or lump form. It is believed that the reagents carry out the following functions: chemically bind unwanted elements in the waste; release the volatile metals from hard to reduce complexes; reduce the oxides to metals; react with $CO_2$, HCl and $SO_2$ during the reduction of oxides to metals; and produce an iron, calcium, aluminum, silicon or other inorganic materials by-product with composition suitable for further applications.

The dried pellets are then fed into a kiln. The kiln is an air tight rotary kiln which is heated directly or indirectly, preferably heated indirectly, to a temperature higher than about 800° C. and preferably in the range of 1000–1150° C. The heat is obtained by an electrical, gas fired, direct microwave, infrared or other heating source. The counterflow gas may also be heated and used as an energy source.

The heated material in the kiln is contacted with counterflow gas comprising an inert gas such as nitrogen and/or a reducing gas such as CO, hydrogen, methane or combinations thereof, or a mildly oxidizing gas. The reducing gas and the oxygen concentration should be lower than 10% by volume and preferably less than about 4% by volume depending on whether the metals in the gas stream are to be oxidized to metal oxides. The $CO_2$ concentration should be lower than about 20% by volume and preferably less than about 3%. Preferably, each of the CO and $H_2$ concentrations is less than 5% by volume to reduce and vaporize the desired metals and/or metal oxides and to vaporize alkali metal salts. The retention time at the reaction temperature is usually less than about 20 minutes.

The vaporized metal concentrate comprises mostly Zn, Cd and Pb and is separated from the gas stream on a high temperature filter, cyclone or by electrostatic precipitation and stored in a silo. Generally, the concentration of impurities like Fe, Mn, Ca is very low and the alkali metal salts can be separated from the metal concentrate by leaching or by thermal processing before the concentrate is shipped for further refining. The $O_2$ and $CO_2$ can be separated from the gas and the gas is optionally recycled back into the process.

The solid residual product is then removed from the kiln and cooled. The solid product preferably has less than 10,000 ppm of Zn, Cd or Pb. The solid product can be recycled to a steel, cement, metal alloy or mineral fibre making process.

The following are particular examples of the invention as described above.

EXAMPLE 1

An indirectly electrically heated rotary kiln with diameter of 70 mm was used to process the following four samples of industrial by-product materials with the chemical composition set out in Table 1 below:

Sample #1 being zinc calcine made from roasting zinc mineral concentrates;

Sample #2 being flue dusts from zinc smelting and zinc refining;

Sample #3 being flue dust from Waelz processes; and

Sample #4 being zinc ash skimming from galvanizing bath operation.

TABLE #1

| Element | Sample #1 | Sample #2 | Sample #3 | Sample #4 | Unit |
| --- | --- | --- | --- | --- | --- |
| Zn | 58.9 | 42.0 | 55.0 | 54.0 | % |
| Pb | 0.52 | 7.5 | 9.5 | | % |
| Si | 2.4 | | 0.3 | | % |
| Ca | 0.12 | | 0.8 | | % |
| Fe | 12.5 | | 3.1 | 0.8 | % |
| Mg | 0.08 | | 0.2 | | % |
| Mn | | | 0.6 | | % |
| K | | | 1.8 | | % |
| Na | | | 1.6 | | % |
| Al | | | 0.1 | | % |
| C | | | 0.5 | | % |
| Co | 0.01 | | | | % |
| Ag | 0.03 | | | | % |
| Cu | 0.9 | 4.3 | 0.03 | | % |
| As | | | 0.01 | | % |
| Ba | | | 0.01 | | % |
| Cd | 0.3 | | 0.01 | | % |
| Sn | 0.18 | 2.2 | 0.02 | | % |
| Cl | | 5.5 | 3.1 | 2.5 | % |

The four above samples were mixed together and homogenized. Fine carbon, calcium oxide, silica oxide and alumina were added to the mixture to a concentration of 13%, 5%, 3% and 1% respectively of the total weight. After homogenizing the mixture, 16% by weight of water was added to obtain material for shaping by extrusion. The material was extruded with 4 mm die openings. After extrusion the material was dried using an electrically heated oven at 120 to 250° C. to prevent the water from evaporating too quickly from the pellets which would cause the pellets to lose shape. After the pellets were dried, the pellets were screened to separate dust particles below 1.0 mm. The moisture content was less than 1% by weight.

The dried pellets were fed at a rate of 10 g/min by means of a piston type feeder into a sealed reactor kiln. The temperature of the kiln was controlled in the hot zone at 1070° C. The nitrogen countercurrent gas flow was set at 560 litres per hour and an operating vacuum was set to 0.05" of water column to keep air leaks from the atmosphere at a minimum.

The tube rotation was set at 3 rpm and the angle of the kiln was set so that the retention time of pellets in the hot zone was 20 min. The particles of volatile metals and oxides and sodium and potassium chloride were separated from the gas stream by high temperature filtration.

EXAMPLE 2

The process carried out in Example 1 was followed in Example 2. The materials sample used in Example 2 was 75% by-product materials as set out in Table 1, and 25% electric air furnace dust (EAFD) with the composition set out in Table 2 below.

TABLE #2

| Element | Sample #1 | Sample #2 | Sample #3 | Unit |
|---|---|---|---|---|
| Zn | 31.0 | 23.0 | 24.6 | % |
| Pb | 2.77 | 2.03 | 1.94 | % |
| Si | 1.36 | 1.72 | 1.49 | % |
| Ca | 11.9 | 11.1 | 13.0 | % |
| Fe | 18.3 | 21.6 | 22.7 | % |
| Mg | 0.82 | 3.93 | 2.36 | % |
| Mn | 1.74 | 2.70 | 3.01 | % |
| K | 1.48 | 1.16 | 0.92 | % |
| Na | 3.06 | 2.3 | 1.88 | % |
| Al | 0.47 | 0.54 | 0.48 | % |
| C | 0.92 | 1.60 | 0.72 | % |
| Cr | 1350 | 1440 | 1400 | ppm |
| Cu | 2530 | 2860 | 2620 | ppm |
| As | 25 | 28 | 26 | ppm |
| Ba | 294 | 322 | 356 | ppm |
| Cd | 492 | 415 | 390 | ppm |
| Ni | 176 | 161 | 132 | ppm |
| Ag | 82 | 78 | 53 | ppm |

Generally, EAFD is agglomerated collections of microfine and chemically complex particles which is formed in the electric arc furnace during the steel making process by metal vaporization, subsequent reaction with oxygen within the furnace and deposition on condensed nuclei. EAFD is typically brown-grey dust (0.1–10 microns) with bulk density 500–800 kg/m$^3$ and a moisture content of less than 1%. The chemical composition of EAFD comprises a phase of spinel with a magnetite ($Fe_3O_4$) or zinc ferrite ($ZnFe_2O_4$) structure, and zinc oxide (ZnO) and haematite ($Fe_2O_3$).

EXAMPLE 3

The process carried out in Example 1 was followed in Example 3. The material used in Example 3 was a mix of EAFD samples as set out in Table 2.

EXAMPLE 4

The process carried out in Example 1 was followed in Example 4. The material used in Example 4 was 75% EAFD as set out in Table 2 and 25% was a plater sludge with the composition set out in Table 3 below. The plater sludge moisture content was 44%. The final moisture content before shaping was adjusted to 16% in the produced pellets.

TABLE #3

| Element | Sample #1 | Unit |
|---|---|---|
| Zn | 130526 | mg/kg |
| Pb | 58 | mg/kg |
| Ca | 2992 | mg/kg |
| Fe | 134737 | mg/kg |
| Mg | 1859 | mg/kg |
| Mn | 1421 | mg/kg |
| Hg | <8.4 | mg/kg |
| Co | 48 | mg/kg |
| Al | 211 | mg/kg |
| Sb | 777 | mg/kg |
| Cr | 9421 | mg/kg |
| Cu | 2170 | mg/kg |
| As | 85 | mg/kg |
| Ba | 115 | mg/kg |
| Cd | 22 | mg/kg |
| Ni | 872 | mg/kg |
| Ag | <0.4 | mg/kg |

EXAMPLE 5

14% plastic film material of polypropylene, polyethylene, and PVC was shredded and melted at 350° C. with 70% EAFD, 7% fine carbon, 3% fine silica oxide, 5% of calcium oxide and 1% of alumina oxide, by weight.

Particles in the range of 0.2–6 mm were separated and processed with the same operating parameters as in Example 1 after drying.

The separated concentrate of metals and metal oxides and the solid by-product were analysed for Examples 1, 2, 3, 4 and 5. The results of the analysis are presented in Tables 4 and 5 below, Table 4 showing the iron by-products analysis and Table 5 showing the analysis of the zinc concentrate. The leachability of the solid by-product was analysed and the results are presented in Table 6.

TABLE #4

| Element | Example #1 | Example #2 | Example #3 | Example #4 | Example #5 | Unit |
|---|---|---|---|---|---|---|
| Zn | 6800 | 600 | 5380 | 1800 | 950 | ppm |
| Pb | 1600 | 350 | 245 | 1290 | 230 | ppm |
| Cd | 1.5 | 1.3 | 1.2 | 1.5 | 1.1 | ppm |
| Cr | 150 | 1300 | 2300 | 3660 | 2400 | ppm |
| Ba | 150 | 520 | 698 | 513 | 705 | ppm |
| Ag | | | 43 | 63 | 50 | ppm |
| Fe | 7500 | 17300 | 389000 | 282000 | 365000 | ppm |
| Ca | 55000 | 84000 | 198000 | 169000 | 152000 | ppm |
| Cu | 9600 | 5400 | 3740 | 3720 | 3700 | ppm |
| K | 450 | 250 | 1440 | 220 | 190 | ppm |
| Mg | 2300 | 3400 | 55600 | 50500 | 53200 | ppm |
| Mn | 8000 | 26500 | 37600 | 37100 | 37400 | ppm |
| Na | 7600 | 9800 | 11200 | 13400 | 8500 | ppm |
| Ni | 450 | 670 | 355 | 1040 | 330 | ppm |
| Ti | 680 | 2500 | 3480 | 1220 | 2500 | ppm |

TABLE 5

| Element | Example #1 | Example #2 | Example #3 | Example #4 | Example #5 | Unit |
|---|---|---|---|---|---|---|
| Zn | 71.9 | 70.3 | 69.5 | 66.6 | 67.4 | % |
| Pb | 3.63 | 3.97 | 4.82 | 4.75 | 4.77 | % |
| Fe | 670 | 1150 | 1902 | 3.82 | 520 | ppm |
| Cd | 1250 | 1460 | 1570 | 1820 | 1670 | ppm |
| Na | 1.58 | 2.51 | 3.66 | 3.64 | 3.67 | % |
| Mg | 95 | 120 | 189 | 94 | 156 | ppm |
| Ni | 30 | 30 | 40 | 30 | 40 | ppm |
| K | 1.45 | 2.30 | 3.43 | 3.40 | 3.41 | % |
| Ca | 740 | 870 | 1510 | 362 | 950 | ppm |
| Mn | 60 | 97 | 118 | 49 | 90 | ppm |
| F | 0.15 | 0.20 | 0.20 | 0.21 | 0.20 | % |
| Cl | 3.25 | 4.85 | 7.97 | 8.15 | 8.10 | % |
| Ag | | | 14 | 14 | 14 | ppm |
| Al | | | 95 | 84 | 90 | ppm |
| Ba | | | 3 | 4 | 3 | ppm |
| Cr | | | 11 | 9 | 11 | ppm |
| Cu | | | 45 | 45 | 45 | ppm |

TABLE 6

| Element | Example #1 | Example #2 | Example #3 | Example #4 | Example #5 | Unit |
|---|---|---|---|---|---|---|
| As | <0.001 | <0.001 | <0.001 | <0.001 | <0.001 | ppm |
| Ba | .94 | 1.60 | 3.51 | 2.59 | 4.62 | ppm |
| Cd | 0.01 | 0.017 | 0.010 | 0.036 | 0.011 | ppm |
| Cr | 0.03 | 0.04 | 0.05 | 0.06 | 0.04 | ppm |
| Pb | 0.25 | 0.37 | 0.32 | 0.41 | 0.28 | ppm |
| Hg | <0.0005 | <0.0005 | 0.0005 | <0.0005 | 0.0005 | ppm |
| Se | <0.001 | <0.001 | 0.001 | <0.001 | 0.005 | ppm |
| Ag | <0.03 | 0.04 | <0.03 | 0.04 | <0.03 | ppm |

EXAMPLE 6

The zinc concentrate was leached by distilled water to separate the soluble sodium and potassium chlorides. The zinc concentrate was then separated from the leachate by vacuum filtration. The separated zinc concentrate was then analysed for Examples 1, 2 3, 4 and 5 after separating it from sodium and potassium chlorides. This analysis is presented in Table 7 below.

TABLE 7

| Element | Example #1 | Example #2 | Example #3 | Example #4 | Example #5 | Unit |
|---|---|---|---|---|---|---|
| Zn | 76.8 | 75.2 | 74.4 | 73.5 | 73.7 | % |
| Pb | 3.9 | 4.3 | 5.2 | 5.4 | 5.1 | % |
| Fe | 450 | 1100 | 2140 | 1220 | 285 | ppm |
| Ca | 180 | 330 | 450 | 150 | <50 | ppm |
| Cl | 620 | 1740 | 950 | 1140 | 3800 | ppm |

The process of the invention may also be used to recover metals and metal oxides from metal bearing ores, lead blast furnace slag, industrial minerals, waste materials, by-products, brass mill dust, zinc plant leach residue, steel furnace dust, steel mill and foundry waste, waste or sludge from plater or galvanized operation, or other waste containing Zn, Pb, Cd, As, Fe, Hg and Se.

Further modifications and changes can be made to the embodiment of the invention as described above without departing from the scope of the invention as specifically set out in the claims below.

We claim:

1. A process for separating and recovering metals and non-metals from industrial waste material containing at least one of the elements zinc, lead, cadmium, iron, mercury, arsenic or selenium comprising the steps:
   (a) mixing said industrial waste material comprising said metals and non-metals with alkali earth metals and alkali metal complexes of alumina and silica oxides, and a reducing agent to form a solid agglomerated material;
   (b) feeding the solid agglomerated material to a rotary kiln for passage therethrough and heating the solid agglomerated material to a temperature greater tan about 800° C. to form a heated solid agglomerated material;
   (c) contacting the heated agglomerated material with a flow of inert, reducing or mildly oxidizing gas containing carbon dioxide or oxygen, or a combination thereof, wherein the concentration of $CO_2$ is lower than about 20% by volume, and the $O_2$ concentration is lower than about 10% volume, whereby any zinc, lead, cadmium, mercury arsenic or selenium are volatilized as elements or oxides thereof leaving a residual solid product;
   (d) removing the volatilized metals, non-metals or oxides thereof from the kiln as gases for recovery thereof; and
   (e) separately recovering said residual solid product.

2. A process as claimed in claim 1 wherein zinc and lead metals and metal oxides thereof are volatilized.

3. A process as claimed in claim 1 wherein the metals and non-metals volatilized additionally comprise cadmium, arsenic mercury and selenium.

4. A process as claimed in claim 1 wherein the solid residual product includes iron, aluminum and silicon.

5. A process as claimed in claim 1 wherein said gas has a counterflow velocity of less than 4 metres per second.

6. A process as claimed in claim 4 wherein the solid product comprises 10,000 ppm or less of zinc or lead.

7. A process as claimed in claim 1 wherein the $O_2$ concentration is 4% by volume or less.

8. A process as claimed in claim 1 wherein the $CO_2$ concentration is 3% by volume or less.

9. A process as claimed in claim 1 wherein the gas has a counterflow velocity of less than 0.5 metres per second.

10. A process as claimed in claim 2, recovering Zn and Pb metals and metal oxides on a high temperature filter.

11. A process as claimed in claim 1 wherein the solid agglomerated material is heated to a temperature between about 1000 to 1150° C.

12. A process as claimed in claim 1 wherein the solid agglomerated material is heated to a temperature between about 1000 to 1150° C. for less than 20 minutes.

13. A process as claimed in claim 1 wherein the industrial waste material is electric arc furnace dust.

14. A process as claimed in claim 1 wherein the industrial waste material is plater sludge.

15. A process as claimed in claim 1 wherein the industrial waste material is electric arc furnace dust and plater sludge.

16. A process for separating and recovering metals and metal oxides from electric arc furnace dust containing zinc, lead or cadmium comprising the steps:
   (a) mixing and processing electric arc furnace dust comprising one or more of said metals and metal oxides with alkali earth metals, complexes of alumina and silica oxides, and a reducing agent comprising carbon or hydrocarbons, to form a solid agglomerated material;
   (b) feeding said solid agglomerated material to a rotary kiln for passage therethrough and heating the solid agglomerated material in the kiln to a temperature between about 1000 to 1150° C.;

(c) contacting the heated agglomerated material in the kiln with a counterflow of CO gas at a gas velocity of less than 4 metres/second wherein the CO concentration is less than 5% by volume, whereby said metals and metal oxides are volatilized, and recovering any volatilized zinc, lead and cadmium;

(d) leaching any zinc and lead concentrate to remove soluble impurities;

(e) refining the zinc and lead concentrate; and (f) removing residual solid product.

17. A process as claimed in claim 16 in which the solid aggregated material is heated indirectly.

18. A process as claimed in claim 16 in which the solid aggregated material is heated indirectly and directly.

19. A process as claimed in claim 16 in which the solid aggregated material is heated directly.

* * * * *